United States Patent
Wang et al.

(10) Patent No.: US 10,786,853 B2
(45) Date of Patent: Sep. 29, 2020

(54) COOLING SYSTEM FOR ROTATING CUTTING TOOLS

(71) Applicant: United Technologies Corporation, Farmington, CT (US)

(72) Inventors: Zhigang Wang, South Windsor, CT (US); Changsheng Guo, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/021,894

(22) Filed: Jun. 28, 2018

(65) Prior Publication Data
US 2020/0001381 A1    Jan. 2, 2020

(51) Int. Cl.
*B23C 5/28*    (2006.01)
*B23Q 11/10*    (2006.01)

(52) U.S. Cl.
CPC .............. *B23C 5/28* (2013.01); *B23Q 11/10* (2013.01)

(58) Field of Classification Search
CPC ... B23Q 11/141; B23Q 11/145; B23Q 11/146; B23Q 11/1015; B23Q 11/1023; B23Q 11/1046; B23C 5/28; B23B 27/10; B23B 51/06; Y10T 408/44; Y10T 408/45; Y10T 408/455; Y10T 409/303976; Y10T 409/304032
See application file for complete search history.

(56) References Cited

U.S. PATENT DOCUMENTS

| | | | |
|---|---|---|---|
| 160,161 A * | 2/1875 | Clay | B23B 27/10 407/11 |
| 3,455,000 A * | 7/1969 | Flaherty | B23B 27/10 407/118 |
| 3,842,596 A * | 10/1974 | Gray | F01D 5/088 60/736 |

(Continued)

FOREIGN PATENT DOCUMENTS

| DE | 19730539 C1 | 4/1999 |
|---|---|---|
| EP | 2865472 A1 | 4/2015 |

(Continued)

OTHER PUBLICATIONS

Extended European Search Report for EP Application No. 19182699.9, dated Nov. 29, 2019, 7 pages.

*Primary Examiner* — Alan Snyder
*Assistant Examiner* — Yasir A Diab
(74) *Attorney, Agent, or Firm* — Kinney & Lange, P.A.

(57) ABSTRACT

A rotary tool includes a shank, cutting portion, coolant inlet, coolant outlet, and channel system. The cutting portion is connected to and extends from the shank. The cutting portion includes a cutting edge. The coolant inlet and the coolant outlet are disposed in the shank. The channel system is contained in the rotary tool and is a closed circulation loop system such that the coolant is contained within the channel system as the coolant is circulated within the rotary tool. The channel system includes a delivery path and a return path. The delivery path is fluidly connected to the coolant inlet and includes a shape corresponding to a shape of the cutting edge. The return path is fluidly connected to the coolant outlet and to the delivery path at a location in the cutting portion of the rotary tool.

11 Claims, 5 Drawing Sheets

(56) References Cited

U.S. PATENT DOCUMENTS

| | | | | |
|---|---|---|---|---|
| 5,265,505 A | * | 11/1993 | Frechette | B23Q 1/0018 29/39 |
| 5,761,974 A | | 6/1998 | Wang et al. | |
| 5,829,926 A | * | 11/1998 | Kammermeier | B23B 51/02 408/59 |
| 6,503,246 B1 | * | 1/2003 | Har-Shai | A61B 18/02 606/21 |
| 6,637,984 B2 | * | 10/2003 | Murakawa | B23B 27/10 407/11 |
| 7,634,957 B2 | | 12/2009 | Ghosh et al. | |
| 7,938,822 B1 | * | 5/2011 | Berzak | A61B 18/02 606/20 |
| 8,215,878 B2 | | 7/2012 | Rozzi et al. | |
| 8,303,220 B2 | | 11/2012 | Rozzi et al. | |
| 2003/0079485 A1 | * | 5/2003 | Nakata | B23Q 11/141 62/185 |
| 2003/0110781 A1 | * | 6/2003 | Zurecki | B23Q 11/1053 62/64 |
| 2004/0215178 A1 | * | 10/2004 | Maurice | A61B 18/02 606/22 |
| 2004/0234350 A1 | * | 11/2004 | Jager | B23B 51/06 409/136 |
| 2011/0306958 A1 | * | 12/2011 | Berzak | A61B 18/02 606/24 |
| 2012/0237311 A1 | * | 9/2012 | Dionne | B23Q 11/1061 409/135 |
| 2013/0034399 A1 | * | 2/2013 | Omagari | B23C 5/109 409/136 |
| 2015/0037110 A1 | * | 2/2015 | Wunderlich | B23Q 5/04 408/1 R |
| 2017/0173706 A1 | | 6/2017 | Georgiou | |
| 2018/0009058 A1 | | 1/2018 | Bamat et al. | |
| 2018/0104750 A1 | | 4/2018 | Levasseur et al. | |

FOREIGN PATENT DOCUMENTS

| | | |
|---|---|---|
| WO | WO95/29030 A1 | 11/1995 |
| WO | WO2009/03279 A1 | 3/2009 |
| WO | WO2018/046489 A1 | 3/2018 |

\* cited by examiner

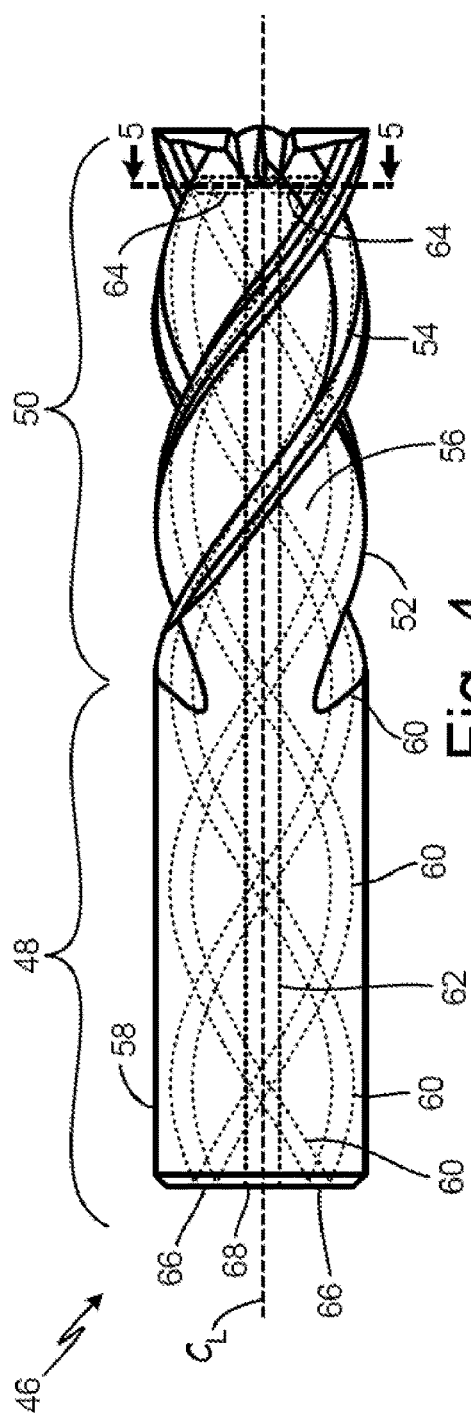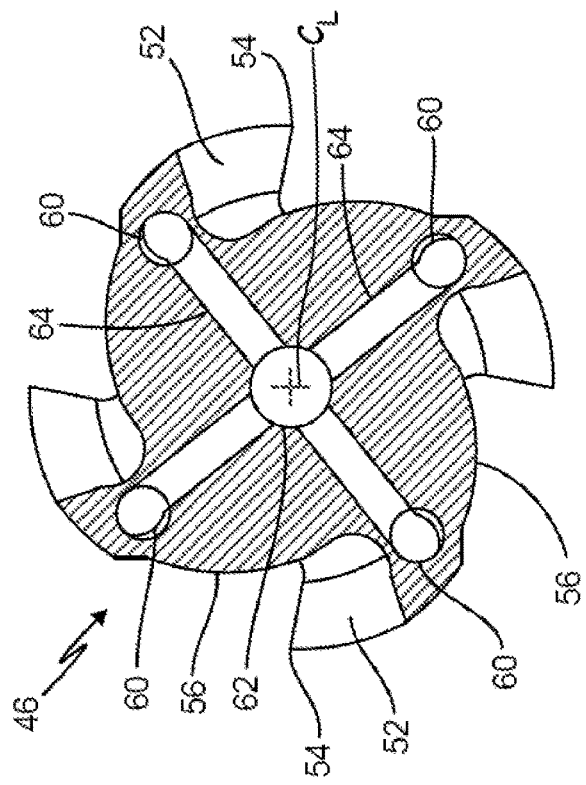

COOLING SYSTEM FOR ROTATING CUTTING TOOLS

BACKGROUND

This disclosure relates generally to rotating cutting tools. More particularly, this disclosure relates to management of thermal energy via internal delivery of coolant in rotating cutting tools.

In metal cutting, heat is generated due to plastic deformation of the material being cut and the friction between the machined surface and the tool. These contacts, between the chip-tool and tool-workpiece, are the primary heat sources acting on the tool and cause the tool to get quite hot. Once the tool reaches its characteristic temperature, the tool material gets softened and does not maintain its mechanical strength, which consequently causes tool wear as the result of this thermo-mechanical interaction. Under normal operating conditions, the tool does not soften, but the natural wear rate does increase as the tool temperature increases. The primary process parameters that affect tool temperature include cutting speed, feed rate, and depth of cut. Increasing any one of these variables can lead to a greater material removal rate. The depth of cut and feed rate are limited by the available cutting power and machining stability. With the increase of cutting speeds without causing any increase of cutting load, higher material removal rates can be increased, however, the cutting temperature increases quickly with the cutting speed.

In order to control tool temperatures in order to enable a higher material removal rate while maintaining an acceptably low wear rate (and thus an acceptably high tool life), metal-working fluid is usually applied to the process. That fluid is often referred to as a "coolant" or "cutting fluid". The most widely used method of cutting fluid delivery is by various external nozzles aimed at the cutting area. The cutting fluid provides cooling as well as some lubrication, the latter in particular as it relates to flushing and evacuation of chips from the cutting zone. Even though the application of cutting fluid is generally helpful to obtain the desired results in terms of cooling and lubrication of cutting tools, it also comes with a significant cost. For example, the continuous stream of cutting fluid during machining consumes large quantities of power and fluid. Such coolant supply systems consume large amounts of the cutting fluid, which imposes large capital investment associated with procurement, storage and handling of the cutting fluids. This cost does not account for the health risks to which operators are exposed when using these fluids. Cutting fluids may contain hazardous wastes, and so contact with fluids or their mists can cause maladies such as dermatitis and respiratory diseases. Large capacity mist collectors are often required for high-pressure, high flow rate applications which consume additional power.

SUMMARY

A rotary tool includes a shank, a cutting portion, a coolant inlet, a coolant outlet, and a channel system. The cutting portion is connected to and extends from the shank. The cutting portion includes a cutting edge. The coolant inlet is disposed in a portion of the shank. The coolant outlet is disposed in another portion of the shank. The channel system is contained in the shank and in the cutting portion of the rotary tool to circulate coolant within the rotary tool. The channel system is a closed circulation loop system such that the coolant is contained within the channel system as the coolant is circulated within the rotary tool. The channel system includes a delivery path and a return path. The delivery path is fluidly connected to the coolant inlet and includes a shape corresponding to a shape of the cutting edge. The return path is fluidly connected to the coolant outlet and to the delivery path at a location in the cutting portion of the rotary tool.

A method of cooling a rotary tool includes connecting the rotary tool to a tool holder so that a coolant inlet of the tool holder connects with a coolant inlet of the rotary tool and so that a coolant outlet of the tool holder connects to a coolant outlet of the rotary tool. The rotary tool includes a shank, a cutting portion, a tooth disposed on the cutting portion, and a channel system. The shank portion includes the coolant inlet and coolant outlet of the rotary tool. The cutting portion is connected to and extends from the shank portion. The tooth includes a cutting edge extending outward from the tooth. The channel system is disposed within the shank and cutting portions of the rotary tool and includes a delivery path and a return path. The tool holder and the rotary tool are rotated. Coolant is circulated through the tool holder and the rotary tool. Thermal energy is transferred from the tooth of the rotary tool to the coolant flowing through the channel system of the rotary tool. The coolant is delivered to the coolant outlet of the tool holder via the coolant outlet of the rotary tool. The coolant is output from the tool holder.

A closed circulation loop system for delivering a coolant includes a refrigeration system for extracting thermal energy from the coolant, a tool holder fluidly connected to the refrigeration system, and a rotary tool that is mechanically connected to the tool mount. The tool holder includes a stator, a cooling inlet, a cooling outlet, and a tool mount. The cooling inlet is disposed in and extend through a first portion of the stator. The cooling outlet is disposed in and extend through a second portion of the stator. The tool mount is in rotational engagement with the stator and includes a cooling inlet channel and a cooling outlet channel. The cooling inlet channel of the tool mount is in fluid communication with the cooling inlet of the tool holder. The cooling outlet channel of the tool mount is in fluid communication with the cooling outlet of the tool holder. The rotary tool includes a shank portion, a cutting portion, a tooth, and a channel system. The cutting portion is connected to and extends from the shank portion. The tooth is disposed on the cutting portion and includes a cutting edge extending outward from the tooth. The channel system contains the coolant within the rotary tool and is disposed in the rotary tool to circulate coolant within the rotary tool in order to cool the rotary tool. The channel system includes at least one coolant inlet disposed on an end of the shank, at least one coolant outlet disposed on the same end of the shank as the at least one coolant inlet, a delivery path, and a return path. The delivery path is fluidly connected to the cooling inlet of the tool holder via the cooling inlet of the channel system and delivers the coolant from the at least one coolant inlet of the channel system to the tooth of the rotary tool. The return path is fluidly connected to the delivery path and to the cooling outlet of the tool holder via the cooling outlet of the channel system and delivers the coolant to the at least one coolant outlet of the channel system. The coolant is disposed in each of the refrigeration system, the tool holder, and the rotary tool such that the coolant receives thermal energy from the cutting edge of the tooth during operation of the closed circulation loop system.

BRIEF DESCRIPTION OF THE DRAWINGS

FIG. 4 is a side view of the tool with the cooling channels shown in phantom.

FIG. 5 is a cross-section view of the tool taken from 5-5 shown in FIG. 4.

DETAILED DESCRIPTION

The following disclosure includes a closed circulation loop coolant application system for rotating cutting tools such as milling cutters and drills. The closed circulation loop cooling system includes a rotating tool holder with internal cooling channels, a compressor, a pump, and a refrigerant (cooling) medium in the closed circulation loop system. The closed circulation loop system produces and delivers a two phase cooling medium (e.g., in liquid and vapor states) internally to an area underneath cutting edges of the rotating cutting tool. An internal cold flow delivery path for the cooling medium is in proximity to a cutting edge of the rotating cutting tool.

A coolant cavity is formed in the cutting tool for supplying the cooling medium to the internal coolant flow delivery path and a return path for cooling medium is downstream from the cold flow delivery. An outlet port is coupled to the return path for recycling the used cooling medium. The two phase coolant compressor and pump is used to form the two-phase flow and then supply coolant to the rotating cutting tool. The system can be tuned to deliver the correct liquid-vapor volume percentage to achieve optimum cooling for the rotating cutting tool.

As for the cooling medium, there are several that can be incorporated, such as water, liquid nitrogen ("LN$_2$"), and carbon dioxide ("CO$_2$"). In terms of cooling capability, water provides very good thermal transfer properties because of its high latent heat, and which is suitable for use in high temperature environments. Nitrogen has a low heat capacity, low thermal conductivity and low heat of vaporization, which is also known to be a good thermo-insulator. Ammonia and CO$_2$ are easier to liquefy than nitrogen, so there is less work involved for a compressor to change the phase of these mediums from a gas to a liquid which can make the refrigeration system of the closed circulation loop system with ammonia and/or CO$_2$ more efficient in terms of energy.

In order to achieve an efficient cooling method, this disclosure presents a rotating tool with closed circulation loop internal cooling channels that uses an energy efficient refrigerant medium, such as ammonia or CO$_2$. To get highest cooling capability, the cooling medium cycles between liquid and vapor states in a closed circulation loop configuration.

Figure 1:
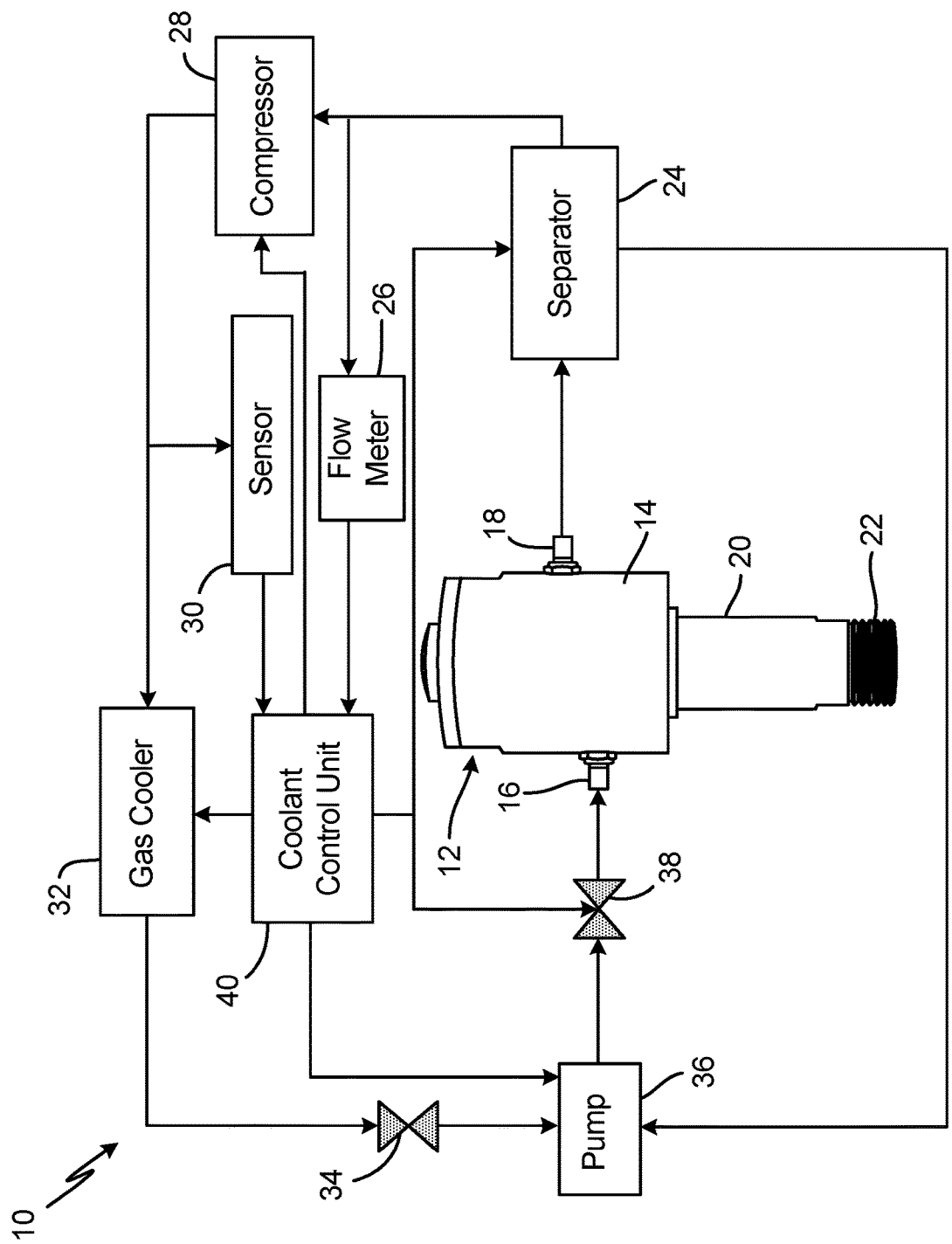
FIG. 1 is a schematic view of a closed circulation loop coolant delivery system.

FIG. 1 is a schematic view of closed circulation loop system 10 and shows tool holder 12 (including stator 14, inlet 16, outlet 18, and tool mount 20 with threading 22), separator 24, flow meter 26, compressor 28, sensor 30, gas cooler 32, valve 34, pump 36, valve 38, and coolant control unit 40.

Closed circulation loop system 10 is a closed circulation loop coolant delivery system for delivery of a coolant to a rotary tool. Tool holder 12 is a mechanical device for rotating a rotary tool. Stator 14 is a generally tubular portion of solid material. Inlet 16 and outlet 18 are ports for transporting a fluid (e.g., liquid and/or a gas). Tool mount 20 is a generally cylindrical piece of solid material with threading 22 on a distal end of tool mount 20. Threading 22 is a screw thread. Separator 24 is a device or machine that separates gas from liquid. Flow meter 26 is a meter for measuring a flow rate of a fluid running through flow meter 26. Compressor 28 is a device or machine that increases a pressure of the gas by compressing the gas.

Sensor 30 is a device for detecting a characteristic of a fluid passing through or across sensor 30. For example, sensor 30 can be configured to sense at least one of a temperature, a flow rate, a pressure, or other characteristic of flow of coolant across sensor 30. In another example, sensor 30 can include one or more sensors or similar or different types (e.g., configured to measure one or more of temperature, flow rate, and/or pressure). Gas cooler 32 is a device for the cooling of a gas. Valves 34 and 38 are devices for controlling a flow of a fluid passing through valves 34 and 38, respectively. Pump 36 is a device for pressurizing and/or moving a fluid. In this example, a coolant used with closed circulation loop system 10 can include water, LN$_2$, CO$_2$, ammonia, hydrogen, or other fluids with a desirable heat capacity, latent heat, specific latent heat, and/or specific heat properties. Coolant control unit 40 is a controller for controlling management of the coolant within closed circulation loop system 10.

Closed circulation loop system 10 can be mounted and/or incorporated into a manual or an automated tooling machine such as a computer numerical control ("CNC") machine. In another example, closed circulation loop system 10 can be in fluid communication with a source or sources of lubricant and/or cutting oil. Tool holder 12 is connected to and is in fluid communication with separator 24 via outlet 18 and with valve 38 via inlet 16. Stator 14 surrounds and contains a portion of tool mount 20. Stator 14 is rotationally engaged with tool mount 20, such that tool mount 20 rotates relative to stator 14. In one example, stator 14 is mounted to a portion of a CNC machine that closed circulation loop system 10 is installed in. Inlet 16 and outlet 18 are mounted to portions of stator 14. Inlet 16 is connected to valve 38 and outlet 18 is connected to separator 24. Tool mount 20 is attached to stator 14 such that tool mount 20 is in rotatable engagement with stator 14. As will be discussed in additional embodiments disclosed herein, a rotary cutting tool can be mounted to tool mount 20. Threading 22 is disposed on a distal end of tool mount 20 that is on an opposite end of tool mount 20 from stator 14.

Separator 24 is connected to outlet 18 of stator 14, to flow meter 26, to compressor 28, and to pump 36. Flow meter 26 is connected to separator 24, to compressor 28, and to coolant control unit 40. Compressor 28 is connected to separator 24, to flow meter 26, to sensor 30, to gas cooler 32, and to coolant control unit 40. Sensor 30 is connected to compressor 28, to gas cooler 32, and to coolant control unit 40. Gas cooler 32 is connected to compressor 28, to sensor 30, to valve 34, and to coolant control unit 40. Valve 34 is connected to gas cooler 32 and to pump 36. Pump 36 is connected to separator 24, to valve 34, to valve 38, and to coolant control unit 40. Valve 38 is connected to pump 36, to inlet 16 of stator 14, and to coolant control unit 40. Coolant control unit 40 is electrically connected to separator 24, flow meter 26, compressor 28, sensor 30, gas cooler 32, pump 36, and to valve 38. In one example, coolant control unit 40 is connected to and controlled by a machine tool controller (not shown) such that a correct amount of coolant is delivered during operation of closed circulation loop system 10.

Closed circulation loop system 10 produces and delivers a two phase cooling medium (e.g., in both liquid and vapor states) internally to the area underneath cutting edges of a rotary cutting tool attached to tool mount 20. In this example, closed circulation loop system 10 recycles coolant such that the coolant is re-conditioned and re-used to transfer thermal energy from the rotary tool to the coolant more than once. Tool holder 12 holds tool mount 20 in rotational engagement with tool holder 12. Stator 14 is used to mount tool holder 12 to a support structure of a CNC machine such that stator 14 is rotationally affixed to the support structure. Portions of stator 14 also provide mounting surfaces through which inlet 16 and outlet 18 pass through. Inlet 16 provides a channel through which coolant is supplied to tool mount 20 through stator 14. Conversely, outlet 18 provides another channel through which coolant is transferred through stator 14 and out of tool holder 12.

In one example, a rotary tool is mechanically attached to tool mount 20 such that the rotary tool is rotationally driven by tool mount 20. In this example, tool mount 20 is in fluid communication with both inlet 16 and outlet 18. During operation, tool mount 20 delivers coolant to a rotary tool that is attached to tool mount 20 so that the coolant can flow through portions of the rotary tool to provide for transfer of thermal energy from a cutting edge of the rotary tool to the coolant. Threading 22 provides a mechanical engagement feature for connection with a rotary tool such as an end mill or drill bit.

Separator 24 separates a first vapor portion of the coolant created during the transfer of thermal energy to the coolant from a second liquid portion of the coolant. Separator 24 then delivers the first vapor portion of the coolant to compressor 28 via flow meter 26 and the second liquid portion of the coolant to pump 36. In this example, flow meter 26 can measure and/or control a flow of coolant through flow meter 26. In one example, flow meter 26 can measure and/or control the flow of the coolant either actively or passively. Compressor 28 compresses the second liquid portion of the coolant in order to change a phase of the second liquid portion of the coolant from a vapor phase to a liquid phase. Sensor 30 senses and/or measures characteristics of the coolant passing through or across sensor 30. In this example, sensor 30 can communicate sensed characteristics of the coolant to coolant control unit 40 or to another communication device of the CNC machine.

Gas cooler 32 draws thermal energy out of the coolant thereby reducing a temperature of the coolant passing through the gas cooler. Valve 34 controls the amount of flow of the coolant from gas cooler 32 to pump 36. Pump 36 functions to move the coolant to valve 38. Valve 38 controls the amount of flow of coolant to inlet 16 of tool holder 12. In this example, the components of separator 24, flow meter 26, compressor 28, sensor 30, gas cooler 32, valve 34, pump 36, and valve 38 form a refrigeration system for extracting thermal energy from a coolant flowing through closed circulation loop system 10. During operation of closed circulation loop system 10, coolant control unit 40 receives and sends signals in order to control separator 24, compressor 28, gas cooler 32, pump 36, and valve 38 in response to signals received by coolant control unit 40 from flow meter 28 and sensor 30.

As will be discussed in additional embodiments of this disclosure, closed circulation loop system 10 enables more effective cooling of a rotary tool used with closed circulation loop system 10 due to the closed circulation loop configuration of closed circulation loop system 10. The more effective cooling rates of the rotary tool enable higher material removal rates because of the higher cutting speeds that can be achieved. Higher material removal rates mean lower cost, higher productivity, fewer machines, and generally less capital investment for machine processing of materials. The closed circulation loop configuration of closed circulation loop system 10 also reduces the amount of energy consumption for coolant delivery as compared to existing coolant delivery systems and mist collectors by eliminating the need and use of systems that apply coolant externally to the tool. For example, closed circulation loop system 10 can reduce power consumption by 50% or more as compared to existing coolant systems that incorporate external nozzles and pressure systems in order to deliver coolant and/or cutting oil to an interface between the workpiece and the tool surface. Additionally, the closed circulation loop configuration of closed circulation loop system 10 reduces usage and waste of coolant by recycling and reconditioning used coolant.

Figure 2:
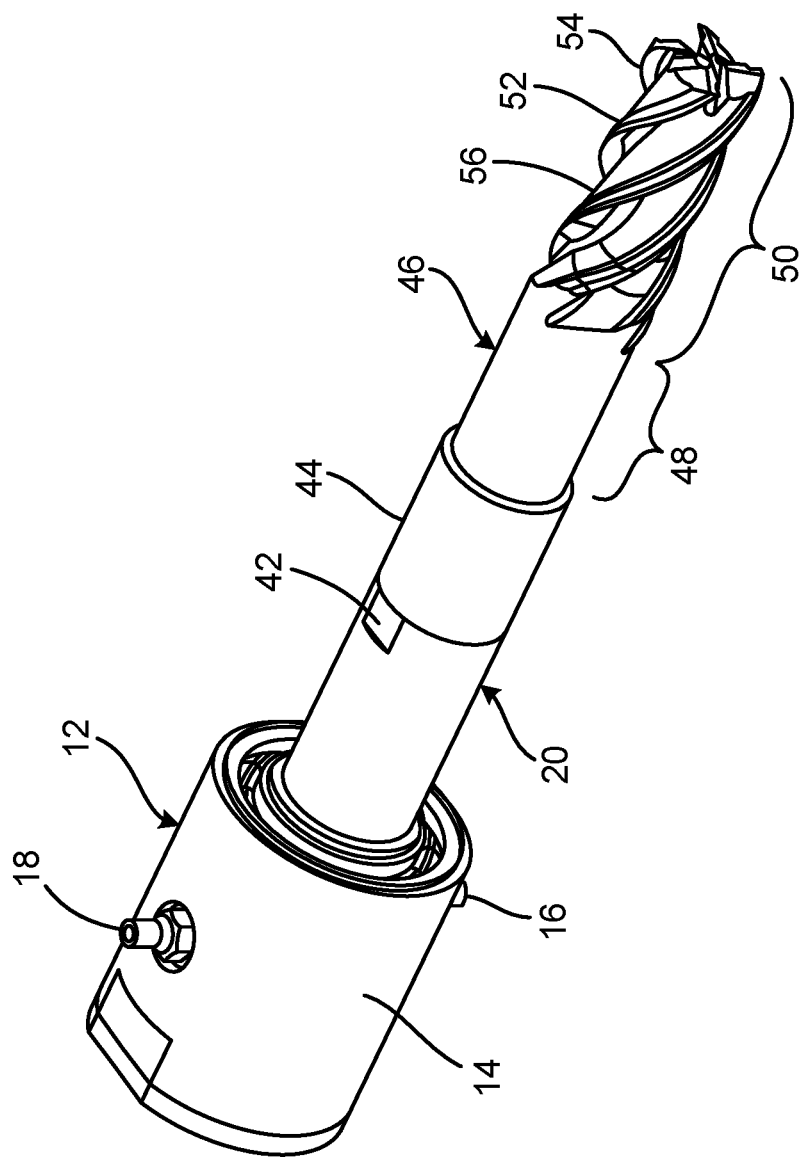
FIG. 2 is a perspective view of a tool holder and a tool.

FIG. 2 is a perspective view of tool holder 12 and shows stator 14 (with inlet 16 and outlet 18), tool mount 20 (with locating feature 42), collar 44, and rotary tool 46 (with shank 48, cutting portion 50, teeth 52, cutting edges 54, and flutes 56).

Locating feature 42 is a flat/planar surface. Collar 44 is tubular piece of solid material. In this example, collar 44 can include a locating feature or features along an internal surface, as well as mechanical engagement features such as threading. In this example, rotary tool 46 is a 4-flute end mill. In other examples, rotary tool can be or be a part of an end mill, a tipped tool, a face-milling tool, a fly-cutter, a drill bit, a countersink, a counterbore, a milling cutter, a tap, a die, a reamer, a lathe, or another type of rotary tool. In this example, shank 48 is a cylindrical piece of solid material with a smooth external surface. Cutting portion 50 is a portion of rotary tool 46 that includes contoured features (e.g., sharp edges) for cutting material. Teeth 52 are sharp edges for cutting. In this example, teeth 52 include a helical shape. In this example, teeth 52 are shown as including four teeth, but can include more or less than four teeth in other examples. Cutting edges 54 are sharp blades. Flutes 56 are helical grooves.

Locating feature 42 is disposed on an end of tool mount 20 that is in contact with collar 44. In this example, collar 44 surrounds and is attached to portions of tool mount 20 and rotary tool 46. For example, an internal surface of collar 44 engages with threading 22 of tool mount 20. Collar 44 is affixed to tool mount 20 such that collar 44 rotates with tool mount 20 as tool mount 20 rotates relative to stator 14 of tool holder 12. Rotary tool 46 is mechanically attached to collar 44 such that rotary tool rotates with collar 44. Rotary tool 46 can be attached to collar 44 via threadable, press-fit, or another non-permanent, semi-permanent, or permanent form of mechanical engagement. Shank 48 extends from and is integrally connected to cutting portion 50. Cutting portion 50 extends from and is integrally connected to shank 48. Teeth 52 are disposed on and extend radially outward from cutting portion 50. Cutting edges 54 are disposed on radially outward and axial edges of teeth 52. Flutes 56 are disposed in cutting portion 50 such that one flute 56 is positioned between two adjacent teeth 52.

Locating feature 42 provides a mistake proofing function for correctly aligning collar 44 with tool mount 20. For example, collar 44 includes a similar and corresponding locating feature along an internal surface of collar 44 that engages with locating feature 42 only when collar 44 is in a single, correct alignment with tool mount 20. Collar 44 detachably mounts rotary tool 46 to tool mount 20 such that rotary tool 46 rotates with tool mount 20 as tool mount 20 rotates relative to stator 14 of tool holder 12 during operation of closed circulation loop system 10. During operation of closed circulation loop system 10, rotary tool 46 is rotated to cut and remove material from a workpiece. Shank 48 provides a mounting surface to which collar 44 attaches to. Cutting portion 50 provides an area of rotary tool 46 that engages with a workpiece such that material of the workpiece is cut by cutting portion 50. Cutting edges 54 of teeth 52 come into contact with material of the workpiece and remove portions of the workpiece material from the workpiece in accordance with instructions. Flute 56 provides a removal path for swarf created as debris or as a byproduct of the cutting process.

Figure 3:
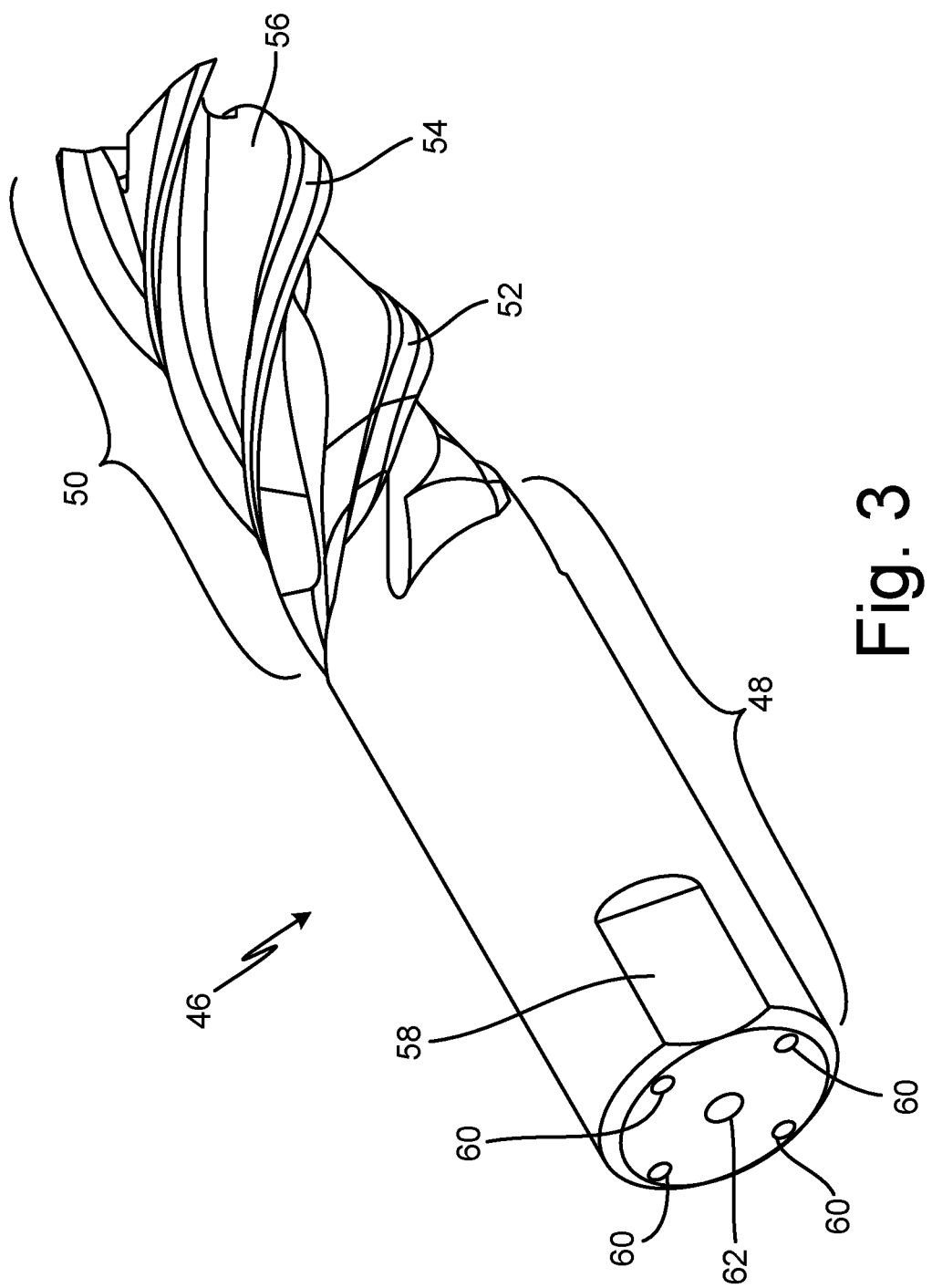
FIG. 3 is a perspective view of the tool with internal cooling channels.

FIG. 3 is a perspective view of rotary tool 46 and shows shank 48, cutting portion 50 (with teeth 52, cutting edges 54, and flutes 56), locating feature 58, delivery paths 60, and return path 62. Locating feature 58 is a flat/planar surface disposed in a distal end of rotary tool 46. Delivery paths 60 and return path 62 are fluidic channels disposed in the material of rotary tool 46. In this example, four delivery paths 60 and one return path 62 are shown. In other examples, rotary tool 46 can include more or less than four delivery paths 60 and more than one return path 62. As is shown in FIG. 3 (and in FIGS. 4-5), rotary tool 46 includes a single, monolithic piece of solid material. For example, rotary tool 46 does not include a separate, removable piece of material attached to a distal end of rotary tool 46 (see e.g., FIGS. 2-5).

Locating feature 58 connects with a corresponding locating feature disposed on an internal surface of collar 44 (shown in FIG. 2). Delivery paths 60 are fluidly connected to inlet 16 (shown in FIGS. 1 and 2) of tool holder 12. Return path 62 is fluidly connected to outlet 18 (shown in FIGS. 1 and 2) of tool holder 12. In this example, delivery paths 60 and return path 62 are connected at an end of rotary tool 46.

Locating feature 58 provides a mistake proofing function for correctly aligning rotary tool 46 collar 44. For example, collar 44 includes a similar and corresponding locating feature along an internal surface of collar 44 that engages with locating feature 58 only when collar 44 is in a single, correct alignment with rotary tool 46. This alignment ensures correct connections of delivery paths 60 and return path 62 with coolant inlets and outlets of tool mount 20. Delivery paths 60 provide an internal flowpath within both shank 48 and cutting portion 50 of rotary tool through which coolant flows within proximity of cutting edges 54 so as to transfer thermal energy from cutting edges 54 to the coolant. Return path 62 provides another internal flowpath within both shank 48 and cutting portion 50 of rotary tool through which coolant flows. Return path 62 transports coolant from delivery paths 60 to outlet 18 of tool holder 12.

Rotary tool 46 is configured to contain the coolant within delivery paths 60 and return path 62 such that coolant is prevented from escaping rotary tool 46 as the coolant is flowing through cutting portion 50. This is in contrast to existing cutting systems in which coolant is either delivered to cutting edges of a rotary tool via external nozzles or via internal delivery with ports in the cutting portion for ejecting the coolant from the rotary tool.

FIG. 4 is a side view of rotary tool 46 and shows shank 48, cutting portion 50 (with teeth 52, cutting edges 54, and flutes 56), locating feature 58, delivery paths 60 (shown in phantom), return path 62 (shown in phantom), and connecting channels 64.

Connecting channels 64 are fluidic pathways that connect delivery paths 60 to return path 62. In this example, connecting channels 64 extend in a radially outward direction from centerline $C_L$ of rotary tool 46.

As can be seen in FIG. 4, the shapes of delivery paths 60 match or correspond to the helical shapes of teeth 52. In this example, portions of delivery paths 60 located in shank 48 include a helical shape. In other examples, the shapes of the portions of delivery paths 60 located in shank 48 can include shapes other than helical such as straight.

Figure 6:
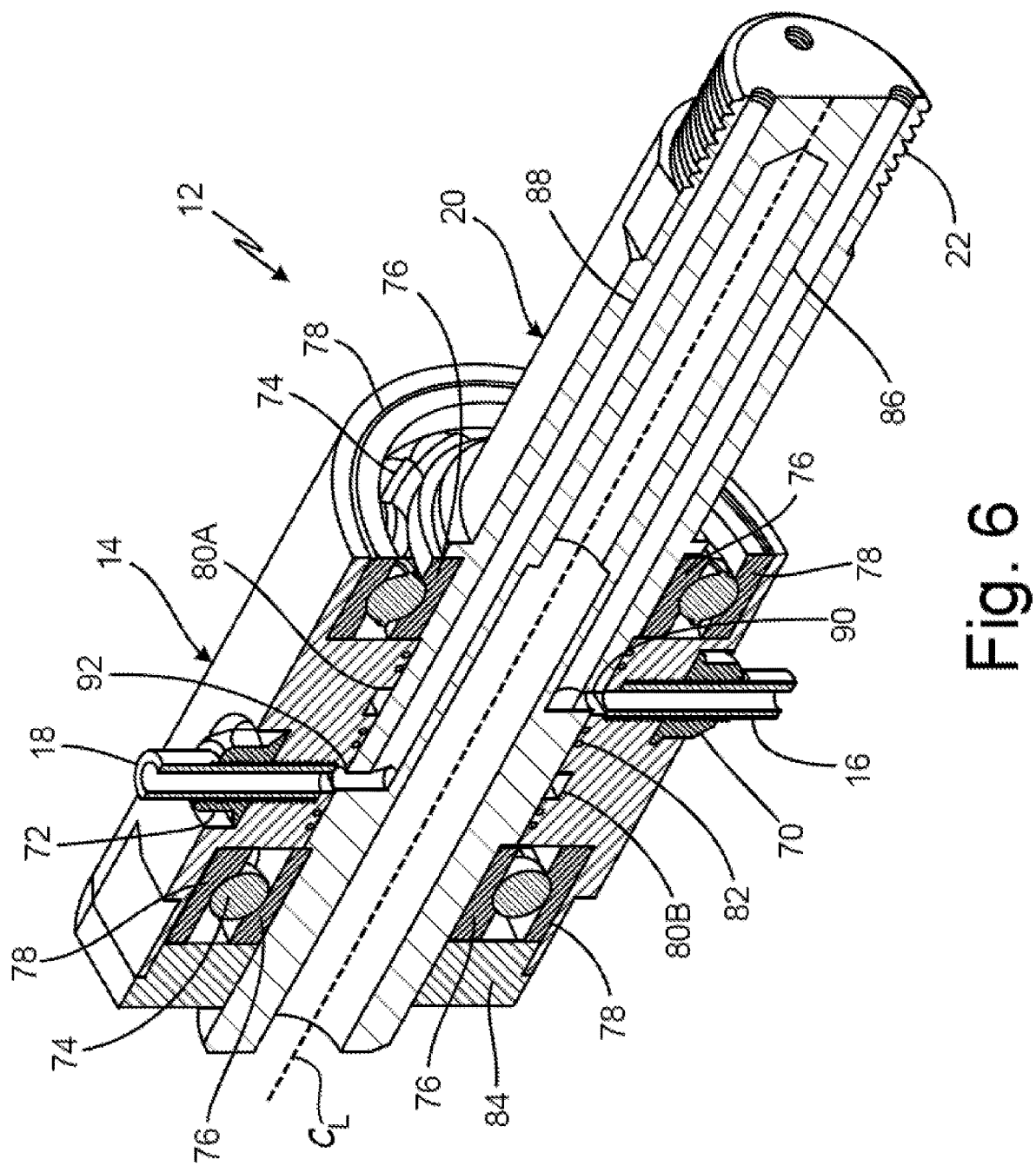
FIG. 6 is a perspective cross-section view of the tool holder.

In this example, delivery paths 60 receive coolant from inlet 16 of tool holder 12 via corresponding inlet channels disposed in tool mount 20 (see e.g., FIG. 6). The coolant enters into delivery paths 60 via coolant inlets 66 on an end of rotary tool 46 (left end as shown in FIG. 4). The coolant is then transported to cutting portion 50 via delivery paths 60. After the coolant is drawn through delivery paths 60 near cutting edges 54 of teeth 52, the coolant is transported from delivery paths 60 to return path 62 via connecting channels 64. The coolant is then drawn out of return path 62 through coolant outlet 68 of rotary tool 46 and transferred out of tool holder 12 through outlet 18.

In this example, a direction of flow of the coolant is such that the coolant flows through delivery paths 60 located radially outward from return path 62, is transported through connecting channels 64 to return path 62, and is then transported through rotary tool 46 and out of return path 62. In another example, a flow of the coolant can be reversed such that return path 62 acts as the input to the fluid system and the helical shaped delivery paths 60 receive the coolant from return path 62 and also deliver the coolant to coolant inlets 66 (acting as coolant outputs in this example) of rotary tool 46. The direction of flow of the coolant can be used to adjust the rates of thermal energy transfer along different portions of teeth 52 of rotary tool 46. For instance, it may be desirable to transfer more energy from the end of rotary tool 46 into the coolant as compared to transferring thermal energy from along lengthwise portions of cutting edges 54 of teeth 52. For example, the first component to receive a portion of the flow of the coolant would experience coolant at a lower temperature than a portion of rotary tool 46 that subsequently receives that same portion of the flow of coolant.

FIG. 5 is a cross-section view of rotary tool 46 taken along 5-5 in FIG. 4 and shows teeth 52, cutting edges 54, and flutes 56, delivery paths 60, return path 62, and connecting channels 64. As shown in FIG. 5, connecting channels 64 provide pathways or flowpaths for coolant to be transferred from delivery paths 60 to return path 62 that is disposed coaxial with and along centerline $C_L$ (shown as into the page in FIG. 5) of rotary tool 46 (see e.g., FIGS. 4 and 5). Here, return path 62 is disposed at a center point of rotary tool 46. Additionally, this view shows the positioning of delivery paths 60 relative to teeth 52 and to cutting edges 54. In this example, a number of delivery paths 60 (e.g., four) corresponds to a number of teeth 52 (e.g., four). In other examples, there can be more or less than one delivery path 60 per tooth 52, such as two delivery paths per tooth, etc.

In this example, cross-sectional shapes of delivery paths 60 are shown as circular. In another example, the cross-sectional shapes of delivery paths 60 can correspond to a cross-section shape of one or more teeth 52. In other examples, the cross-sectional shapes of delivery paths 60 can include a lobed, a triangular, or another shape. In one example, extrusion can be used to form rotary tool 46 such that the cross-sectional shapes of delivery paths 60 can be based on a shape or configuration of an extrusion die used during part the extrusion process. For instance, the cross-sectional shape could provide an amount of surface area to maximize and/or optimize the amount of thermal energy transfer from teeth 52 to the coolant flowing through delivery paths 60.

FIG. 6 is a perspective cross-section view of tool holder 12 and shows stator 14 (with inlet 16, outlet 18, inlet boss 70, outlet boss 72, bearings 74, inner races 76, outer races 78, channels 80A and 80B, O-rings 82, end-cap 84) and tool mount 20 (with threading 22, inlet channels 86, outlet channel 88, inlet port 90, and outlet port 92).

Inlet boss 70 and outlet boss 72 are protruding, mounting features of stator 14. In this example, inlet boss 70 and outlet boss 72 are fastening nuts. Bearings 74 are generally spherical pieces of solid material for reducing rotational friction. Inner races 76 and outer races 78 are sleeves or rings of solid material. Channels 80A and 80B are ring-shaped grooves. O-rings 82 are ring-shaped gaskets. End-cap 84 is a lid or cover of solid material. Inlet channels 86 and outlet channels 88 are pathways configured to contain a flow of a fluid. Inlet port 90 and outlet port 92 are apertures allowing for the flow of a fluid therethrough.

Inlet boss 70 is disposed in an opening in stator 14. Inlet 16 is disposed in and extends through inlet boss 70. Outlet boss 72 is disposed in another opening in stator 14. Outlet 18 is disposed in and extends through outlet boss 72. Bearings 74 are disposed between inner races 76 and outer races 78. Inner races 76 are mounted onto radially outward portions of tool mount 20. Inner races 76 are axially aligned with bearings 74 and with outer races 78. Outer races 78 are mounted into radially inward portions of stator 14. Channels 80A and 80B are disposed into a radially inward surface of stator 14 and extend circumferentially around the inward surface of stator 14. Channel 80A is fluidly connected to inlet 16 and channel 80B is fluidly connected to outlet 18. O-rings 82 are disposed between a radially outward surface of tool mount 20 and the radially inward surface of stator 14. End-cap 84 is disposed on and mounted to an end of stator 14.

Inlet channel 86 and outlet channel 88 are disposed in and extend through an inner portion of tool mount 20. Inlet channels 86 are in fluid communication with inlet 16 via channel 80A. Outlet channel 88 is in fluid communication with outlet 18 via channel 80B. Inlet port 90 extends through stator 14 and is in fluid communication with one of inlet channels 86. Outlet port 92 extends through stator 14 at a different axial location than inlet port 90 and is in fluid communication with outlet channel 88.

Inlet boss 70 provides a mounting and locating feature for inlet 16. In one example, inlet boss 70 is mechanically attached to stator 14 and to inlet 16 so as to affix inlet 16 to stator 14. Outlet boss 72 provides a mounting and locating feature for outlet 18. In one example, outlet boss 72 is mechanically attached to stator 14 and to outlet 18 so as to affix outlet 18 to stator 14. Bearings 74 provide rotational support as between inner races 76 and outer races 78, as well as to reduce friction caused from relative rotation between stator 14 and tool mount 20. Bearings 74 also ensure that tool mount 20 and stator 14 remain co-axial during operation of closed circulation loop system 10.

Inner races 76 and outer races 78 locate tool mount 20 and stator 14, respectively relative to each other, as well as contain bearings 74 between inner races 76 and outer races 78. Channels 80A and 80B provide a communication pathway for coolant to flow from rotating tool mount 20 to inlet 16 and outlet 18 of stationary stator 14. Channels 80A and 80B extend circumferentially around stator 14 so as to enable continuous fluid communication between inlet 16 and outlet 18 with inlet channels 86 and outlet channel 88, respectively as tool mount 20 rotates relative to stator 14. O-rings 82 provide a seal for preventing transmission of a fluid (e.g., coolant) across O-rings 82. End-cap 84 functions as a barrier on an end of stator 14 as well as provides an opening through which a portion of tool mount 20 extends. For example, the end of tool mount 20 that extends out of stator 14 and through end-cap 84 can be connected to a rotating spindle of a CNC machine.

Inlet channels 86 transfer coolant from inlet 16, through tool mount 20, and into delivery paths 60 of rotary tool 46 (shown in FIGS. 2-5). Outlet channel 88 transfers coolant from a return path or paths (e.g., return path 62 shown in FIGS. 3-5) in rotary tool 46, through tool mount 20, and to outlet 18. Inlet port 90 delivers coolant from channel 80A that is in fluid communication with inlet 16 to inlet channels 86. Outlet port 92 delivers coolant from outlet channel 88 to channel 80B that is in fluid communication with outlet 18.

Closed circulation loop system 10 with rotary tool 46 incorporating delivery paths 60 and return path 62 contains the coolant within closed circulation loop system 10 as the coolant is circulated. This containment of the coolant prevents any of the coolant from escaping rotary tool 46 during operation of closed circulation loop system 10. The prevention of coolant being released from rotary tool 46 eliminates the need for large capacity mist collectors thereby creating a safer environment for machine operators as well as eliminating the power consumption of the mist eliminators. Closed circulation loop system 10 also reduces the thermal shocks on rotary tool 46 which improves the life of rotary tool and the quality of the machined surface of the workpiece.

DISCUSSION OF POSSIBLE EMBODIMENTS

A rotary tool includes a shank, a cutting portion, a coolant inlet, a coolant outlet, and a channel system. The cutting portion is connected to and extends from the shank. A cutting edge extends outward from the cutting portion. The coolant inlet is disposed in a portion of the shank. The coolant outlet is disposed in another portion of the shank. The channel system is contained in the shank and in the cutting portion of the rotary tool to circulate coolant within the rotary tool. The channel system is a closed circulation loop system such that the coolant is contained within the channel system as the coolant is circulated within the rotary tool. The channel system includes a delivery path and a return path. The delivery path is fluidly connected to the coolant inlet and includes a shape corresponding to a shape of the cutting edge. The return path is fluidly connected to the coolant outlet and to the delivery path at a location in the cutting portion of the rotary tool.

The rotary tool of the preceding paragraph can optionally include, additionally and/or alternatively, any one or more of the following features, configurations and/or additional components.

The cutting edge can extend a length of the cutting portion and a shape of the cutting edge can be helical.

The delivery path extends through the cutting portion of the rotary tool, wherein the shape of the delivery path can correspond to the helical shape of the cutting edge.

The return path extends through the cutting portion of the rotary tool, wherein a shape of the return path can correspond to the helical shape of the cutting edge.

The coolant inlet receives coolant into the rotary tool and delivers the coolant to the channel system, the delivery path delivers the coolant to the cutting portion, the channel system prevents any of the coolant from escaping the rotary tool as the coolant is flowing through the cutting portion of the rotary tool, the return path delivers the coolant from the channel system to the coolant outlet, and the cooling outlet delivers the coolant out of the rotary tool from the channel system.

A method of cooling a rotary tool includes connecting the rotary tool to a tool holder so that a coolant inlet of the tool holder connects with a coolant inlet of the rotary tool and so that a coolant outlet of the tool holder connects to a coolant outlet of the rotary tool. The rotary tool includes a shank, a cutting portion, a tooth disposed on the cutting portion, and a channel system. The shank portion includes the coolant inlet and coolant outlet of the rotary tool. The cutting portion is connected to and extends from the shank portion. The tooth includes a cutting edge extending outward from the tooth. The channel system is disposed within the shank and cutting portions of the rotary tool and includes a delivery path and a return path. The tool holder and the rotary tool are rotated. Coolant is circulated through the tool holder and the rotary tool. Thermal energy is transferred from the tooth of the rotary tool to the coolant flowing through the channel system of the rotary tool. The coolant is delivered to the coolant outlet of the tool holder via the coolant outlet of the rotary tool. The coolant is output from the tool holder.

The method of the preceding paragraph can optionally include, additionally and/or alternatively, any one or more of the following steps, features, configurations and/or additional components.

The coolant can be contained within the rotary tool.

The coolant can be supplied into the coolant inlet of the tool holder, the coolant can be transferred into the channel system disposed within the rotary tool via the cooling inlet of the rotary tool that is fluidly connected to the coolant inlet of the tool holder, the coolant can be delivered to the tooth of the rotary tool via the delivery path of the channel system, the coolant can be transported from the delivery path to the return path of the channel system such that all of the coolant from the delivery path can be delivered to the return path, and/or the coolant can be drawn out of the return path through the coolant outlet of the rotary tool.

A portion of the coolant can be vaporized as a result of the thermal energy transfer.

A separator can separate a vapor portion of the coolant created during the transfer of thermal energy to the coolant from a liquid portion of the coolant, and/or the vapor portion of the coolant can be delivered to a compressor connected to the separator.

The vapor portion of the coolant can be compressed with the compressor and/or the phase of the vapor portion of the coolant can be changed such that the vapor portion of the coolant can go from a vapor state to a liquid state.

Coolant from the compressor can be combined with the liquid portion of the coolant from the separator to form a combined coolant and/or the combined coolant can be sent into the coolant inlet of the tool holder.

The coolant can be prevented from escaping the rotary tool as the coolant is flowing through a cutting portion of the rotary tool.

A closed circulation loop system for delivering a coolant includes a refrigeration system for extracting thermal energy from the coolant, a tool holder fluidly connected to the refrigeration system, and a rotary tool that is mechanically connected to the tool mount. The tool holder includes a stator, a cooling inlet, a cooling outlet, and a tool mount. The cooling inlet is disposed in and extend through a first portion of the stator. The cooling outlet is disposed in and extend through a second portion of the stator. The tool mount is in rotational engagement with the stator and includes a cooling inlet channel and a cooling outlet channel. The cooling inlet channel of the tool mount is in fluid communication with the cooling inlet of the tool holder. The cooling outlet channel of the tool mount is in fluid communication with the cooling outlet of the tool holder. The rotary tool includes a shank portion, a cutting portion, a tooth, and a channel system. The cutting portion is connected to and extends from the shank portion. The tooth is disposed on the cutting portion and includes a cutting edge extending outward from the tooth. The channel system contains the coolant within the rotary tool and is disposed in the rotary tool to circulate coolant within the rotary tool in order to cool the rotary tool. The channel system includes at least one coolant inlet disposed on an end of the shank, at least one coolant outlet disposed on the same end of the shank as the at least one coolant inlet, a delivery path, and a return path. The delivery path is fluidly connected to the cooling inlet of the tool holder via the cooling inlet of the channel system and delivers the coolant from the at least one coolant inlet of the channel system to the tooth of the rotary tool. The return path is fluidly connected to the delivery path and to the cooling outlet of the tool holder via the cooling outlet of the channel system and delivers the coolant to the at least one coolant outlet of the channel system. The coolant is disposed in each of the refrigeration system, the tool holder, and the rotary tool such that the coolant receives thermal energy from the cutting edge of the tooth during operation of the closed circulation loop system.

The closed circulation loop system of the preceding paragraph can optionally include, additionally and/or alternatively, any one or more of the following features, configurations and/or additional components.

A cross-section shape of the delivery path can corresponds to a cross-section shape of the tooth.

A cross-section shape of the delivery path can comprise a circular, a lobed, and/or a triangular shape.

The coolant can be recycled by the closed circulation loop system such that the coolant can be re-conditioned and/or re-used to transfer thermal energy from the rotary tool to the coolant more than once.

The refrigeration system can comprise a separator that can separate a first portion of the coolant that is in a liquid phase from a second portion of the coolant that is in a vapor phase, a compressor that can compress the second portion of the coolant in order to change a phase of the second portion of the coolant from a vapor phase to a liquid phase, and/or a pump that can pump the coolant into the cooling inlet of the tool holder.

The tooth can include a helical shape, wherein a shape of the delivery path can correspond to the helical shape of the tooth.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotary tool comprising:
   a shank;
   a cutting portion connected to and extending from the shank, wherein the cutting portion comprises a tooth with a cutting edge extending outward from the cutting portion, wherein the shank and the cutting portion include a single monolithic piece of solid material;
   a coolant inlet disposed in a portion of the shank;
   a coolant outlet disposed in another portion of the shank; and
   a channel system contained in the shank and in the cutting portion of the rotary tool to circulate coolant within the rotary tool, wherein the channel system is a closed circulation loop system such that the coolant is contained within the channel system as the coolant is circulated within the rotary tool, wherein the channel system comprises:
      a delivery path that is fluidly connected to the coolant inlet;
      a return path that is fluidly connected to the coolant outlet and to the delivery path at a location in the cutting portion of the rotary tool, and
      wherein one of the delivery path or the return path is disposed coaxial with and along a centerline of the rotary tool, and the other of the delivery path or the return path is disposed helically about the centerline of the rotary tool, and wherein both the delivery path and the return path extend through the cutting portion of the rotary tool.

2. The rotary tool of claim 1, wherein the cutting edge extends a length of the cutting portion and the tooth comprises a helical shape.

3. The rotary tool of claim 2, wherein the delivery path extends through the cutting portion of the rotary tool, wherein the shape of the delivery path corresponds to a shape of the cutting portion.

4. The rotary tool of claim 2, wherein the return path extends through the cutting portion of the rotary tool, wherein a shape of the return path corresponds to a shape of the cutting portion.

5. The rotary tool of claim 1, wherein:
   the coolant inlet receives coolant into the rotary tool and delivers the coolant to the channel system;
   the delivery path delivers the coolant to the cutting portion;
   the channel system prevents any of the coolant from escaping the rotary tool as the coolant is flowing through the cutting portion of the rotary tool;
   the return path delivers the coolant from the channel system to the coolant outlet; and
   the cooling outlet delivers the coolant out of the rotary tool from the channel system.

6. A closed circulation loop system for delivering a coolant, the system comprising:
   a refrigeration system for extracting thermal energy from the coolant;
   a tool holder fluidly connected to the refrigeration system, the tool holder comprising:
      a stator;
      a cooling inlet disposed in and extending through a first portion of the stator;
      a cooling outlet disposed in and extending through a second portion of the stator;
      a tool mount in rotational engagement with the stator, wherein the tool mount comprises a cooling inlet channel and a cooling outlet channel, wherein the cooling inlet channel of the tool mount is in fluid communication with the cooling inlet of the tool holder, and wherein the cooling outlet channel of the tool mount is in fluid communication with the cooling outlet of the tool holder; and
   a rotary tool that is mechanically connected to the tool mount, the rotary tool comprising:
      a shank portion;
      a cutting portion connected to and extending from the shank portion, wherein the shank and the cutting portion include a single monolithic piece of solid material;
      a tooth disposed on the cutting portion, the tooth with a cutting edge extending outward from the tooth; and
      a channel system disposed in the rotary tool to circulate coolant within the rotary tool in order to cool the rotary tool, wherein the channel system comprises:
         at least one coolant inlet disposed on an end of the shank portion;
         at least one coolant outlet disposed on the same end of the shank portion as the at least one coolant inlet;
         a delivery path that is fluidly connected to the cooling inlet of the tool holder via the cooling inlet of the channel system, wherein the delivery path delivers the coolant from the at least one coolant inlet of the channel system to the tooth of the rotary tool; and
         a return path that is fluidly connected to the delivery path and to the cooling outlet of the tool holder via the cooling outlet of the channel system, wherein the return path delivers the coolant to the at least one coolant outlet of the channel system, wherein the channel system contains the coolant within the rotary tool, wherein one of the delivery path or the return path is disposed coaxial with and along a centerline of the rotary tool, and the other of the delivery path or the return path is disposed helically about the centerline of the rotary tool, and wherein both the delivery path and the return path extend through the cutting portion of the rotary tool; and
   wherein the coolant is disposed in each of the refrigeration system, the tool holder, and the rotary tool, wherein the coolant receives thermal energy from the cutting edge of the tooth during operation of the closed circulation loop system.

7. The closed circulation loop system of claim 6, wherein a cross-section shape of the delivery path corresponds to a cross-section shape of the tooth.

8. The closed circulation loop system of claim 6, wherein a cross-section shape of the delivery path comprises a circular, a lobed, or a triangular shape.

9. The closed circulation loop system of claim 6, wherein the coolant is recycled by the closed circulation loop system such that the coolant is re-conditioned and re-used to transfer thermal energy from the rotary tool to the coolant more than once.

10. The closed circulation loop system of claim 6, wherein the refrigeration system comprises:
   a separator that separates a first portion of the coolant that is in a liquid phase from a second portion of the coolant that is in a vapor phase;
   a compressor that compresses the second portion of the coolant in order to change a phase of the second portion of the coolant from a vapor phase to a liquid phase; and a pump that pumps the coolant into the cooling inlet of the tool holder.

11. The closed circulation loop system of claim 6, wherein the tooth includes a helical shape, wherein a shape of the delivery path corresponds to the helical shape of the tooth.

\* \* \* \* \*